United States Patent
Klement

(10) Patent No.: US 9,068,488 B2
(45) Date of Patent: Jun. 30, 2015

(54) VAPORIZATION DEVICE FOR A MOTOR VEHICLE EXHAUST SYSTEM, EXHAUST SYSTEM FOR A MOTOR VEHICLE AND METHOD FOR PRODUCING A VAPORIZATION DEVICE

(75) Inventor: Juergen Klement, Asbach-Baeumenheim (DE)

(73) Assignee: Faurecia Emissions Control Technologies, Germany GmbH, Augsburg (DE)

( * ) Notice: Subject to any disclaimer, the term of this patent is extended or adjusted under 35 U.S.C. 154(b) by 1811 days.

(21) Appl. No.: 12/282,678

(22) PCT Filed: Dec. 29, 2006

(86) PCT No.: PCT/EP2006/012609
§ 371 (c)(1),
(2), (4) Date: Aug. 4, 2009

(87) PCT Pub. No.: WO2007/104353
PCT Pub. Date: Sep. 20, 2007

(65) Prior Publication Data
US 2009/0301070 A1    Dec. 10, 2009

(30) Foreign Application Priority Data
Mar. 14, 2006  (DE) .......................... 10 2006 011 670

(51) Int. Cl.
*F01N 3/025* (2006.01)
*F01N 3/08* (2006.01)
(Continued)

(52) U.S. Cl.
CPC ............ *F01N 3/0814* (2013.01); *F01N 3/0253* (2013.01); *F01N 3/106* (2013.01);
(Continued)

(58) Field of Classification Search
CPC .......... F01N 2610/107; F01N 2610/10; F01N 2610/1453; F01N 3/025; F01N 3/0253; F01N 3/18; F01N 3/2033; F01N 3/36; F01N 2240/14; F01N 610/03; F01N 610/10; F01N 610/107; F01N 610/14532; F23D 11/448
USPC .................................... 60/286, 295, 297, 303
See application file for complete search history.

(56) References Cited

U.S. PATENT DOCUMENTS 4,576,617 A * 3/1986 Renevot .......................... 95/279
5,707,227 A * 1/1998 Langen et al. ................. 431/261
(Continued)

FOREIGN PATENT DOCUMENTS

DE       3217920 A1 * 11/1983   ............. F23D 11/44
DE       3516410 A1 * 11/1986   ............. F23D 11/44
(Continued)

OTHER PUBLICATIONS

International Preliminary Report on Patentability dated Nov. 13, 2008.
(Continued)

*Primary Examiner* — Kenneth Bomberg
*Assistant Examiner* — Jonathan Matthias
(74) *Attorney, Agent, or Firm* — Carlson, Gaskey & Olds, PC

(57) ABSTRACT

A vaporization device for a motor vehicle exhaust system vaporizes an oxidizable liquid and introduces a vapor produced from the oxidizable liquid into an exhaust gas flow of the motor vehicle exhaust system. The vaporization device includes a heating element that is arranged in a housing, and which has the form of a glowing filament. The housing has an inlet for the liquid, at least one vaporization chamber, and an outlet for the vapor. The glowing filament is embedded in a glow tube surrounding the glowing filament. The glowing filament and the glow tube constitute a prefabricated unit which is fastened on a side of the housing by the glow tube being mounted directly to the housing. Furthermore, an exhaust system having a vaporization device, and a method of producing a vaporization device are described.

28 Claims, 4 Drawing Sheets

(51) Int. Cl.
*F01N 3/10* (2006.01)
*F01N 3/36* (2006.01)
*F01N 13/18* (2010.01)

(52) U.S. Cl.
CPC ............... *F01N 3/36* (2013.01); *F01N 13/18* (2013.01); *F01N 2240/16* (2013.01); *F01N 2610/03* (2013.01); *F01N 2610/10* (2013.01); *F01N 2610/107* (2013.01)

(56) References Cited

U.S. PATENT DOCUMENTS

| | | | | |
|---|---|---|---|---|
| 5,771,689 A | * | 6/1998 | Bareis et al. | 60/286 |
| 7,062,903 B2 | * | 6/2006 | Brenner et al. | 60/286 |
| 2004/0081592 A1 | * | 4/2004 | Brenner et al. | 422/172 |
| 2005/0120708 A1 | * | 6/2005 | Ranalli et al. | 60/283 |

FOREIGN PATENT DOCUMENTS

| | | | | |
|---|---|---|---|---|
| DE | 19625447 A1 | | 1/1998 | |
| DE | 102005034888 A1 | * | 2/2007 | |
| EP | 1369557 A | | 12/2003 | |
| WO | WO02/064954 A | | 8/2002 | |
| WO | WO03/026777 A | | 4/2003 | |
| WO | WO 03026777 A1 | * | 4/2003 | ............ B01D 53/94 |

OTHER PUBLICATIONS

International Search Report PCT/EP2006/012609.
Written Answer of the International Search Authority PCT/EP2006/012609.
International Preliminary Examination Report of Sep. 12, 2007 for PCT/EP2006/012609.

* cited by examiner

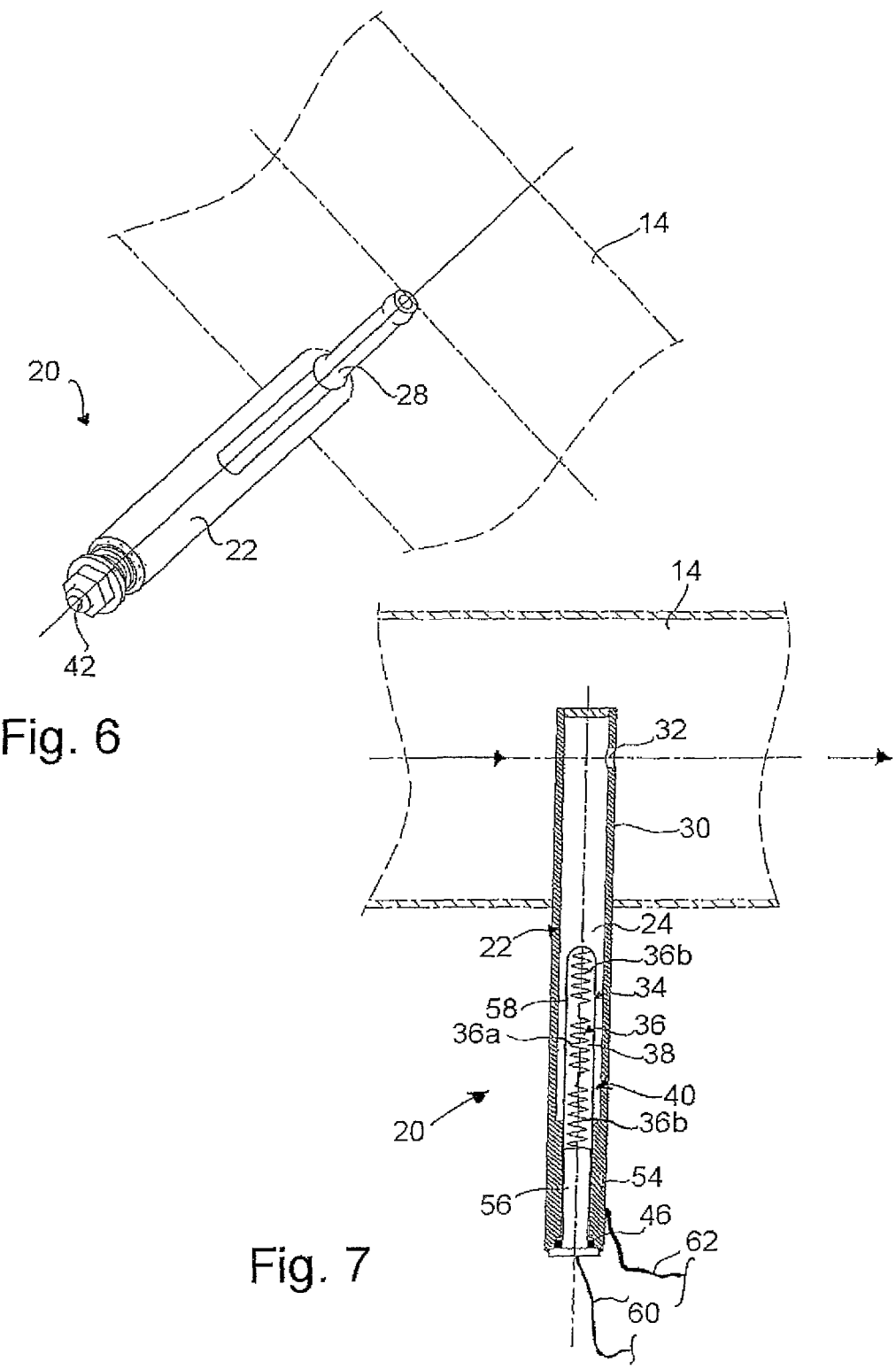

VAPORIZATION DEVICE FOR A MOTOR VEHICLE EXHAUST SYSTEM, EXHAUST SYSTEM FOR A MOTOR VEHICLE AND METHOD FOR PRODUCING A VAPORIZATION DEVICE

RELATED APPLICATIONS

The application is the U.S. National Phase of PCT/EP2006/012609 filed 29 Dec. 2006, which claimed priority to German Application 10 2006 011 670.4 filed 14 Mar. 2006.

TECHNICAL FIELD

The invention relates to a vaporization device for a motor vehicle exhaust system that vaporizes an oxidizable liquid and introduces a vapor produced from the oxidizable liquid into the exhaust gas flow of the motor vehicle exhaust system. The vaporization device includes a heating element that is arranged in a housing, and which has the form of a glowing filament. The housing has an inlet for the liquid, at least one vaporization chamber, and an outlet for the vapor. The glowing filament is embedded in a glow tube surrounding the glowing filament. The invention further relates to an exhaust system for a motor vehicle having such a vaporization device, and to a method of producing such a vaporization device.

BACKGROUND OF THE INVENTION

To regenerate a particulate filter or a $NO_x$-storage catalytic converter, which are increasingly used in modern exhaust systems, it is sometimes necessary, in a lean mixture engine, to enrich the exhaust gas with an oxidizable substance. For this purpose, a fuel vaporization unit is known from document EP 1 369 557 A1, which is arranged upstream of a particulate filter having an oxidation catalytic converter or a $NO_x$-storage catalytic converter connected upstream thereof. The fuel vaporization unit introduces vaporous fuel into the exhaust gas flow upstream of the particulate filter or the $NO_x$-storage catalytic converter at specific points in time. This known vaporization unit has an elongated housing that threadably receives a sheathed-element glow plug, the glowing filament of which serves as a heating element for vaporizing the fuel. To this end, the glow tube of the sheathed-element glow plug surrounding the glowing filament projects into a vaporization chamber for the fuel. A disadvantage in the known configuration is that the threaded connection between the sheathed-element glow plug and the housing of the vaporization unit constitutes a potential leakage point.

In comparison therewith, the invention provides a vaporization device of the type initially mentioned, which when compared to the prior art is distinguished by an improved tightness and low manufacturing costs.

SUMMARY OF THE INVENTION

A vaporization device of the type initially mentioned, includes a glowing filament and a glow tube that constitute a prefabricated unit, which is fastened on a side of a housing by the glow tube itself being mounted directly to the housing of the vaporization device. This dispenses within the prior known housing which was usually provided in a sheathed-element glow plug, surrounded the glow tube, which bore the screw-in thread. Instead, the prefabricated unit comprised of the glowing filament and the glow tube is inserted directly into the housing of the vaporization device. In other words, the housing of the vaporization device replaces the usual sheathed-element housing of conventional sheathed-element glow plug. This configuration provides a cost saving and also provides a tighter fit than that provided by a sheathed-element glow plug screwed into a threaded housing.

A particularly tight fit can be obtained, for example, in that the glow tube is molded in, in particular pressed or cast in, the housing.

According to one embodiment of the invention, a press fit is present between a first portion of the housing and a first portion of the glow tube. Alternatively, or additionally, a bonded connection between a portion of the housing and a portion of the glow tube would also be possible.

Alternatively, the glow tube can be configured integrally with the housing to provide a tight fit. In this configuration, the glowing filament is inserted into the prefabricated unit comprised of the glow tube and the housing.

In one example, a liquid supply pipe is provided which is connected with the vaporization chamber surrounding a second portion of the glow tube. If an enrichment of the exhaust gas is necessary, a specific amount of liquid (for example from a liquid tank provided in the vehicle) is introduced into the vaporization chamber via this liquid supply pipe and vaporizes in this chamber.

The oxidizable liquid is advantageously a fuel, which dispenses with the need to have an additional liquid supply provided in the vehicle. The fuel is then taken directly from the tank or from a fuel pipe already present in the vehicle, and is fed to the inlet of the vaporization device.

The prefabricated unit can furthermore include a connecting pin, the glow tube being placed on and fixed to the connecting pin to close the inside of the glow tube. The prefabricated unit corresponds largely to a usual sheathed-element glow plug that no longer includes the housing bearing the screw-in thread.

According to one example configuration, the housing is an elongated tube and the connecting pin projects outwardly from the tube. This facilitates the electrical connection of the vaporization device.

The glowing filament can in particular comprise a control filament and two heating filaments. In comparison with a conventional glow plug having only one heating filament, an improved heating behavior can now be obtained.

In a further embodiment, a power supply cable is provided which is integrally formed directly to the prefabricated unit. The power supply cable can be fixed to the prefabricated unit by soldering, clamping, crimping or welding, for example. This dispenses the need for a screwed connection.

Furthermore, a ground cable can be provided which is firmly mounted to the housing. This also dispenses with an additional screwed connection.

According to a second aspect of the invention, provision is made for an exhaust system for a motor vehicle, which includes an exhaust pipe and at least one vaporization device according to the invention.

The housing of the vaporization device includes a portion having the outlet, and which projects into the exhaust pipe. The vapor produced is then introduced in a simple manner into the exhaust gas flow via the outlet.

The glow tube may be arranged outside of the housing portion projecting into the exhaust pipe such that the glow tube is not exposed to the exhaust gas temperatures which vary considerably during the operation of the vehicle, or such that the glow tube is exposed thereto merely to a small extent. The ambient conditions under which the liquid vaporization takes place can thus be better controlled and can be designed to be more uniform. Alternatively, it could however also be contemplated to have the glow tube at least partially project into the exhaust pipe.

As already mentioned initially, the vaporization device is arranged upstream of an exhaust gas purification device, in particular of a particulate filter having an oxidation catalytic converter or a $NO_x$-storage catalytic converter connected upstream thereof.

The method according to the invention of producing a vaporization device provides the following steps: manufacturing the housing and fixing a prefabricated separate unit comprised of a glowing filament and a glow tube directly to the housing. This manufacturing method thus distinguishes itself by its simplicity and its cost-effectiveness.

In one example, the glow tube is pressed into the housing. This leads to a tightness that is considerably higher than that obtained when screwing a sheathed-element glow plug into the housing.

An alternative manufacturing method distinguishes itself by the fact that the housing and the glow tube are manufactured as a one-piece unit and that the glowing filament is then inserted into the glow tube. The vaporization device thus obtained also has a particularly high tightness.

These and other features of the present invention can be best understood from the following specification and drawings, the following of which is a brief description.

Further features and advantages of the invention will be apparent from the description below with reference to the enclosed drawings. In the drawings:

BRIEF DESCRIPTION OF THE DRAWINGS

FIG. 6 shows a further perspective view of the vaporization device and the exhaust pipe of FIG. 2.

FIG. 7 shows a longitudinal section through an exhaust pipe and a vaporization device according to a second embodiment of the invention.

DETAILED DESCRIPTION OF THE PREFERRED EMBODIMENT

Figure 1:
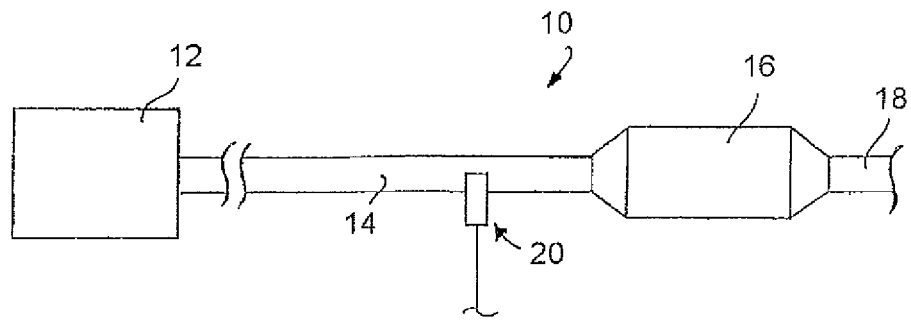
FIG. 1 shows a schematic representation of an exhaust system according to the invention.

FIG. 1 shows an exhaust system 10 that is connected downstream of an engine 12 of a motor vehicle, which can be a diesel engine or a gasoline engine driven by a lean mixture. The exhaust system 10 includes an exhaust pipe having a first tube portion 14 leading to an exhaust gas purification system 16 in the form of a particulate filter having an oxidation catalytic converter or a $NO_x$-storage catalytic converter connected upstream thereof. The exhaust gas purification device 16 is connected with an end region (not shown) of the exhaust system 10 via a second tube portion 18. In addition to the components outlined schematically in FIG. 1, the exhaust system 10 would of course include further components, such as a manifold, an exhaust gas turbocharger, an exhaust gas recirculation device and/or further catalytic converters, the representation of which is dispensed with in FIG. 1 for more clarity.

Figure 4:
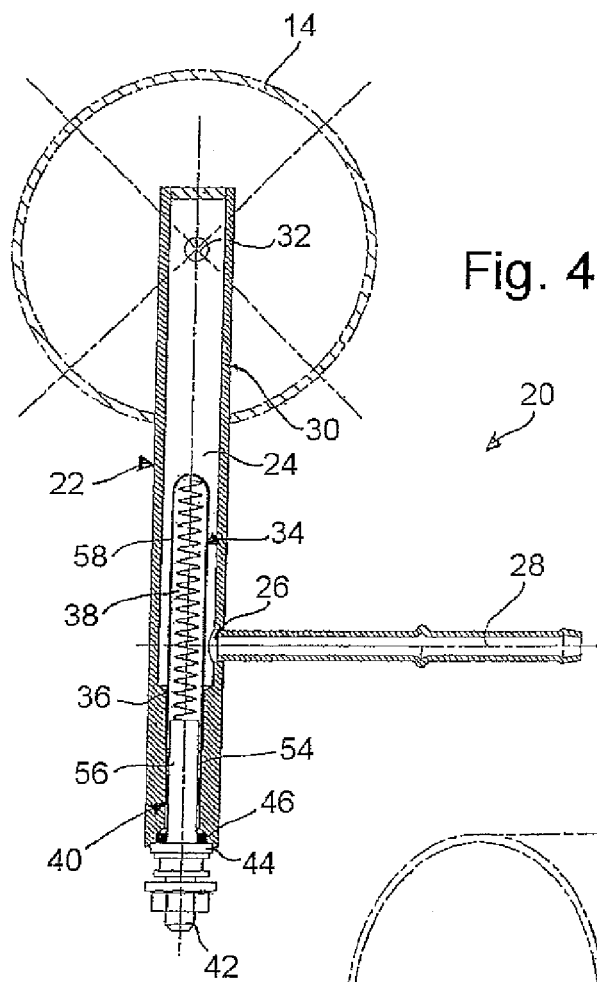
FIG. 4 shows a cross-sectional view of the vaporization device and the exhaust pipe of FIG. 2.
Figure 5:
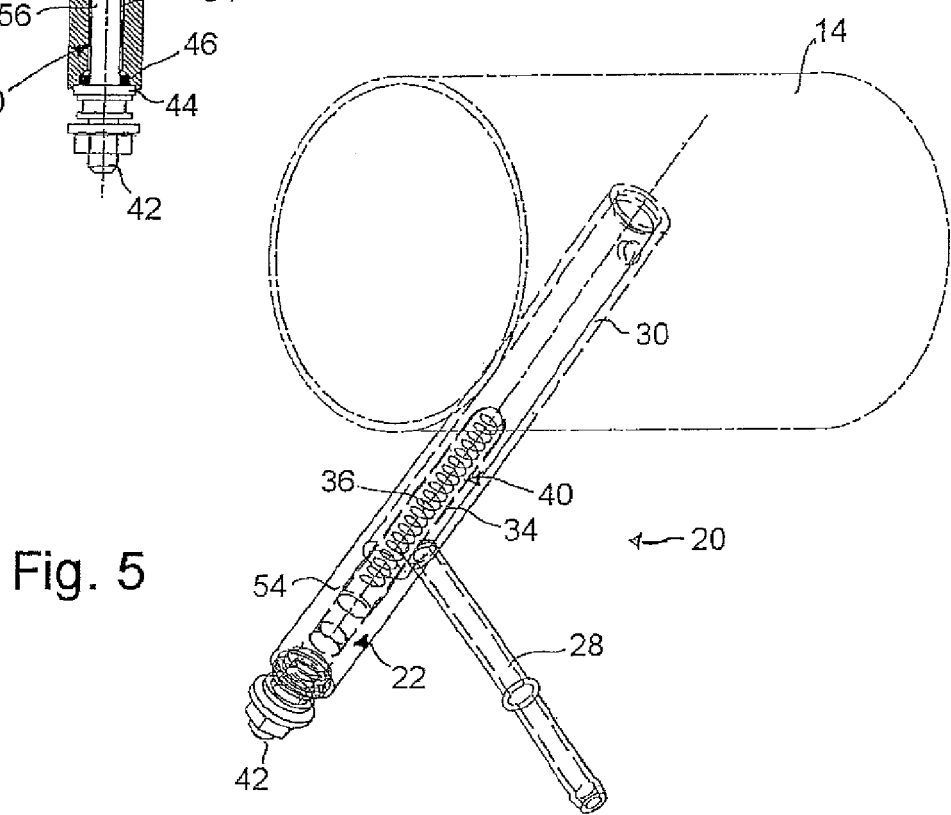
FIG. 5 shows a perspective view of the vaporization device and the exhaust pipe of FIG. 2.

A vaporization device 20 shown in more detail in FIGS. 2 and 4 to 6 is arranged upstream of the exhaust gas purification device 16. The vaporization device 20 has a housing 22 in the form of an elongated tube in which a vaporization chamber 24 for an oxidizable liquid, in particular for a fuel is formed. As shown in FIG. 4, the vaporization chamber 24 is connected with a liquid supply pipe 28 via an inlet 26. The inlet 26 and the liquid supply pipe 28 are arranged laterally on the tubular housing 22 in a region outside of the exhaust pipe.

Figure 2:
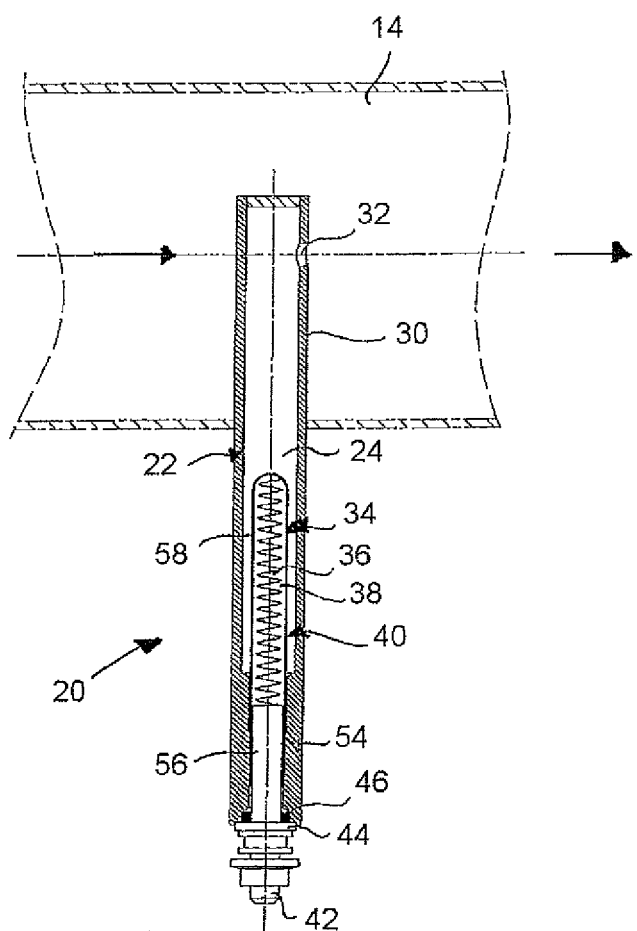
FIG. 2 shows a longitudinal section through an exhaust pipe and a vaporization device of the exhaust system of FIG. 1.

Provided in a portion 30 of the housing 22 projecting into the exhaust pipe is an outlet 32 which is located approximately in the center with respect to the first tube portion 14 of the exhaust pipe, and which is directed in the direction of flow of the exhaust gas (indicated by the arrows in FIG. 2). The outlet 32 is configured as a simple opening in the housing 22.

Figure 3:
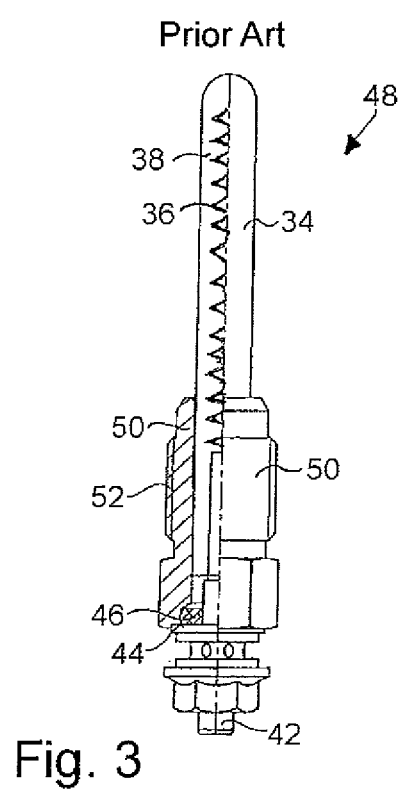
FIG. 3 shows a view of a sheathed-element glow plug according to the prior art partially in section.

Arranged inside the housing 22 is a glow tube 34 in which a glowing filament 36 is embedded. For this purpose, the glow tube 34 is filled with a filling or insulating powder 38. The glow tube 34 and the glowing filament 36 constitute a prefabricated unit 40 which also comprises the insulating powder 38, a connecting pin 42, an insulating disk 44, and a seal 46. The connecting pin 42 is inserted in the glow tube 34, the seal 46 and the insulating disk 44 being interposed, so that the glow tube 34 is fastened to the connecting pin 42 to close the inside of the glow tube 34. The unit 40 thus includes nearly all components of a usual sheathed-element glow plug 48 (see FIG. 3), but with the housing 50 that surrounds the glow tube 34 in the sheathed-element glow plug 48, and in which a screw-in thread 52 is molded, being dispensed with.

In the vaporization device 20 according to the invention, the glow tube 34 itself is mounted directly to the housing 22 of the vaporization device 20 and in particular molded therein, a press fit being present between a first portion 54 of the housing 22 (in the lower part of FIG. 2) and a first portion 56 of the glow tube. The prefabricated unit 40 is inserted in the housing 22 such that at least the connecting pin 42 projects from the housing.

A second portion 58 (an upper portion as shown in FIG. 2) of the glow tube 34 extends into the vaporization chamber 24. In the embodiment shown, the length of the housing 22 is chosen such that the glow tube 34 is arranged completely outside of the housing portion 30 projecting into the exhaust pipe.

When manufacturing the vaporization device 20, the housing 22 is manufactured first. The prefabricated separate unit 40 is then fastened directly to the housing 22 by pressing the glow tube 34 into the housing 22. For this purpose, the housing 22 can be slightly expanded, for example by heating.

Figure 8:
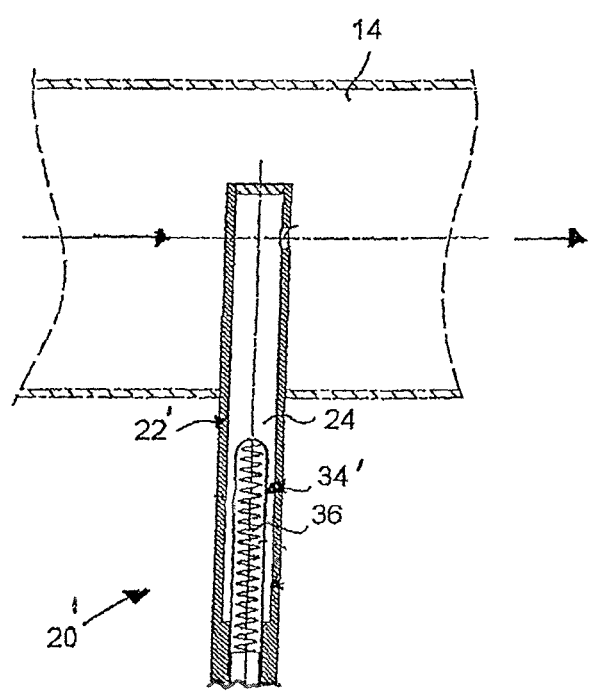
FIG. 8 shows a longitudinal section through the exhaust pipe and another example of a vaporization device.

Alternatively, a vaporization device 20' includes a housing 22' that may also be manufactured as a one-piece unit with the glow tube 34' as shown in FIG. 8, the glowing filament 36 being then inserted into the glow tube 34' in a further method step.

To initiate the regeneration of the exhaust gas purification device 16, an oxidizable liquid, in particular a fuel, is fed to the vaporization chamber 24 of the vaporization device 20 via the liquid supply pipe 28, where the oxidizable liquid is vaporized by the glowing filament 36, which serves as a heating element. The vapor produced enters, via the outlet 32, the exhaust gas flow upstream of the exhaust gas purification device 16 and thus ensures an enrichment of the exhaust gas.

FIG. 7 shows a vaporization device 20 according to a second embodiment of the invention. Similar components or components having the same function bear the same reference numerals, and merely the differences to the vaporization device 20 described so far are discussed below.

In the vaporization device 20 of FIG. 7, the glowing filament 36 includes, as usual, one control filament 36*a* but also includes two heating filaments 36*b*. A power supply cable 60 is integrally formed, for example soldered, directly to the prefabricated unit 40. A ground cable 62 is furthermore provided which is firmly mounted, for example soldered, to the housing 22. Corresponding screwed connections can therefore be dispensed with.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A vaporization device for a motor vehicle exhaust system for vaporizing an oxidizable liquid and introducing a vapor produced from the oxidizable liquid into an exhaust gas flow of the motor vehicle exhaust system, the vaporization device comprising:
   a housing having an inlet for an oxidizable liquid, at least one vaporization chamber, and an outlet for a vapor, wherein the housing comprises an elongated tube having an open end and a closed end, the outlet being formed within a side wall of the elongated tube at a location between the open and closed ends;
   a heating element arranged in the housing and having a form of a glowing filament, wherein the glowing filament is embedded in a glow tube surrounding the glowing filament; and
   wherein the glowing filament and the glow tube constitute a prefabricated unit fastened on a side of the housing by the glow tube being mounted directly to a portion of the housing that includes the outlet, and wherein the portion that has the outlet is configured to project into the exhaust gas flow, and wherein the glow tube is arranged external to the exhaust gas flow.

2. The vaporization device according to claim 1, wherein the glow tube is molded in the housing.

3. The vaporization device according to claim 1, including a press fit between a first portion of the housing and a first portion of the glow tube.

4. The vaporization device according to claim 1, including a liquid supply pipe that is connected with the vaporization chamber that surrounds a second portion of the glow tube.

5. The vaporization device according to claim 1, wherein the oxidizable liquid is a fuel.

6. The vaporization device according to claim 1, wherein the prefabricated unit further includes a connecting pin, the glow tube being placed on and fixed to the connecting pin to close an inside of the glow tube.

7. The vaporization device according to claim 6, wherein the housing is an elongated tube, and wherein the connecting pin projects outwardly of the elongated tube.

8. The vaporization device according to claim 1, wherein the glowing filament comprises a control filament and two heating filaments.

9. The vaporization device according to claim 1, including a power supply cable that is mounted directly to the prefabricated unit.

10. The vaporization device according to claim 1, including a ground cable that is firmly mounted to the housing.

11. The vaporization device according to claim 1, wherein the prefabricated unit includes a connecting pin and a seal, the connecting pin being inserted in the glow tube to press the seal against the housing, and wherein the glow tube is fastened to the connecting pin to close an inside of the glow tube.

12. The vaporization device according to claim 1, wherein the elongated tube defines a central axis extending from the open end to the closed end, the outlet being offset from the axis in a radial direction.

13. The vaporization device according to claim 1, wherein the elongated tube comprises a single straight tube that extends from the open end to the closed end, and wherein the closed end is configured to be positioned within an exhaust gas passage.

14. An exhaust system for a motor vehicle including:
   an exhaust pipe;
   at least one vaporization device comprises a housing having an inlet for an oxidizable liquid, at least one vaporization chamber, and an outlet for a vapor, wherein the housing comprises an elongated tube having an open end and a closed end, the outlet being formed within a side wall of the elongated tube at a location between the open and closed ends;
   a heating element arranged in the housing and having a form of a glowing filament, wherein the glowing filament is embedded in a glow tube surrounding the glowing filament;
   wherein the glowing filament and the glow tube constitute a prefabricated unit inserted through the open end and fastened on a side of the housing by the glow tube being mounted directly to a portion of the housing that includes the outlet; and
   wherein the housing of the vaporization device comprises the portion that has the outlet and which projects into the exhaust pipe, and wherein the glow tube is arranged outside of the portion of the housing that projects into the exhaust pipe.

15. The exhaust system according to claim 14, wherein the vaporization device is arranged upstream of an exhaust gas purification device comprising one of a particulate filter having an oxidation catalytic converter or a $NO_x$-storage catalytic converter connected upstream thereof.

16. The exhaust system according to claim 14, wherein the tube defines a tube central axis extending from the open end to the closed end, the outlet being offset from the tube central axis in a radial direction.

17. The exhaust system according to claim 16, wherein the exhaust pipe defines a pipe central axis that is intersected by the tube central axis.

18. The exhaust system according to claim 17, wherein the pipe and tube central axes are perpendicular.

19. The exhaust system according to claim 14, wherein the elongated tube has an upstream side and a downstream side with the outlet being formed in downstream side.

20. The exhaust system according to claim 19, wherein the outlet intersects the pipe center axis.

21. The exhaust system according to claim 14, wherein the elongated tube comprises a single straight tube that extends from the open end to the closed end, and wherein the closed end and the outlet are located within the exhaust pipe.

22. A method of producing a vaporization device for a motor vehicle exhaust system for vaporizing an oxidizable liquid and introducing a vapor produced from the oxidizable liquid into an exhaust gas flow of the motor vehicle exhaust system, the vaporization device including a heating element arranged in a housing and having the form of a glowing filament, the housing having an inlet for the liquid, at least one vaporization chamber, and an outlet for the vapor, the method including the following steps:

a) producing the housing and a glow tube as a one-piece unit by forming an elongated tube to have an open end and a closed end, the outlet being formed within a side wall of the elongated tube at a location between the open and closed ends, and wherein the one-piece unit is configured to have the outlet project into the exhaust gas flow with the glow tube being arranged external to the exhaust gas flow; and b) subsequently inserting the glowing filament through the open end and into the glow tube.

23. The method according to claim 22, wherein the elongated tube comprises a single straight tube that extends from the open end to the closed end.

24. A method of producing a vaporization device for a motor vehicle exhaust system for vaporizing an oxidizable liquid and introducing a vapor produced from the oxidizable liquid into an exhaust gas flow of the motor vehicle exhaust system, the vaporization device including a heating element arranged in a housing and having the form of a glowing filament, the housing having an inlet for the liquid, at least one vaporization chamber, and an outlet for the vapor, the method including the following steps:

a) manufacturing the housing by forming an elongated tube to have an open end and a closed end, the outlet being formed within a side wall of the elongated tube at a location between the open and closed ends; and b) inserting a prefabricated separate unit comprised of the glowing filament and a glow tube into the open end of the housing and fixing the prefabricated separate unit directly to a portion of the housing that includes the outlet, wherein the portion that has the outlet is configured to project into the exhaust gas flow, and wherein the glow tube is arranged external to the exhaust gas flow.

25. The method according to claim 24, including pressing the glow tube into the housing.

26. The method according to claim 24, wherein the prefabricated unit includes a connecting pin and a seal, and including the steps of inserting the connecting pin in the glow tube to press the seal against the housing, and fastening the glow tube to the connecting pin to close an inside of the glow tube.

27. The method according to claim 24, wherein the elongated tube defines a central axis extending from the open end to the closed end, and including offsetting the outlet from the central axis in a radial direction.

28. The method according to claim 24, wherein the elongated tube comprises a single straight tube that extends from the open end to the closed end.

* * * * *